Patented Oct. 25, 1938

2,134,505

UNITED STATES PATENT OFFICE 2,134,505

DYESTUFF-SULPHONIC ACIDS OF THE DI-OXAZINE SERIES AND PROCESS OF PREPARING THEM

Arnold Brunner, Heinrich Greune, Max Thiele, and Karl Thiess, Frankfort-on-the-Main, Germany, assignors to General Aniline Works, Inc., New York, N. Y., a corporation of Delaware No Drawing. Application October 4, 1935, Serial No. 43,632. In Germany October 10, 1934

12 Claims. (Cl. 260—246)

The present invention relates to dyestuff-sulphonic acids of the dioxazine series and to a process of preparing them.

We have found that valuable dyestuff-sulphonic acids are obtainable by treating in the absence of an organic solvent a 1.4-benzoquinone derivative, containing sulpho-groups, of the following formula:

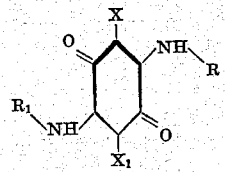

wherein R and $R_1$ represent a sulphonated diarylamine radical which may substituted at the nitrogen atom, and X and $X_1$ stand for hydrogen, alkyl, aryl or halogen, with an acid condensing agent such as sulphuric acid, chloro-sulphonic acid, fuming sulphuric acid or an alkaline condensing agent such as ammonia, sodium carbonate, caustic soda solution or the like, preferably in the presence of an organic or inorganic oxidizing agent, such as chloranil, benzoquinone, pyrolusite, permanganate, lead peroxide, hydrogen peroxide or the like.

In some cases, for instance, when using fuming sulphuric acid as condensing agent, it is advantageous to heat, for instance, at temperatures of about 90° C. to about 130° C. the dyestuff-sulphonic acids obtained with dilute acids in order to split off non-desired sulpho-groups.

As condensing agent there may be used with advantage fuming sulphuric acid of any content of $SO_3$, for instance, 20% of $SO_3$.

The parent materials may be made by condensing in water or alcohol a 1.4-benzoquinone derivative, for instance, benzoquinone, toluquinone, tetrachloroquinone, tetrabromoquinone, 2.6-dichloroquinone with an amino-sulphonic acid of a diarylamine, the imino-hydrogen atom of which may be substituted. Amino-sulphonic acids of diarylamines may easily be prepared by various methods, for instance, by causing a halogen-nitro-sulfonic acid, for example, of the bengen- or naphthalene series, which contains a reactive halogen atom to react, in the presence of an acid-binding agent, with an organic amino-compound, such as aniline, acetanilide, methylaniline, a toluidine, a xylidine, an amino-diphenylamine, a naphthylamine, 2-amino-5.6.7.8-tetrahydronaphthalene, an aminocarbazole, aminofluorene, aminopyrene, aminochrysene or a derivative or substitution product thereof and reducing the nitro-diarylamino-sulphonic acids at first formed which, if desired, have been acylated.

The dyestuff-sulfonic acids obtainable according to the present process are new. They probably belong to the dioxazine series and dye animal and vegetable fibers, as well as viscose fibers and mixed fabrics, fast tints.

The following examples serve to illustrate the invention, but they are not intended to limit it thereto; the parts are by weight:

(1) 100 parts of the condensation product obtainable from 1 mol. of tetrachloroquinone and 2 mols of 4-amino-diphenyl-amine-2-sulphonic acid (made, for instance, by causing the two components to react in alcohol or water in the presence of an acid-binding agent) are dissolved in 2000 parts of fuming sulphuric acid containing 20 per cent of sulphuric anhydride and treated therewith for about 1 to 2 hours at ordinary temperature or for some more hours at a temperature of about 0° C. to about +5° C. 2600 parts of ice are then added. The dyestuff may be separated by salting out; it is filtered with suction, washed with a solution of sodium chloride until free from acid and dried. Since the dyestuff is obtained in a highly sulphonated state, a considerable part of it remains dissolved. It is, therefore, advantageous to boil the solution for about 5 hours in a reflux apparatus after addition of the above indicated quantity of ice. The whole is then diluted with about the equal quantity of water, whereby the dyestuff acid separates completely; it may be filtered with suction without loss and transformed into the sodium salt. Whereas the parent material dissolves in sulphuric acid to a brown solution, the dyestuff dissolves to a blue solution. It dyes animal and vegetable fibers, as well as viscose fibers and mixed fabrics, clear blue tints.

(2) 100 parts of the condensation product obtainable from 1 mol. of tetrachloroquinone and 2 mols of 4-amino-4'-methoxy-diphenylamine-2-sulfonic acid (made, for instance, by reaction of the two components in alcohol or water in the presence of an acid-binding agent) are introduced into 2000 parts of fuming sulphuric acid containing 20 per cent of sulphuric anhydride and stirred for 1 to 2 hours at ordinary temperature. The solution is then poured on ice, the dyestuff-sulphonic acid is salted out, filtered with suction, washed until free from acid and dried.

The dyeings obtained with it are similar to those obtained with the dyestuff obtainable as prescribed in Example 1. The dyestuff dissolves in concentrated sulphuric acid to a green solution, whereas the parent material dissolves in the acid to a blue solution.

(3) 100 parts of the condensation product from 1 mol of benzoquinone and 2 mols of 4-amino-diphenylamine-2-sulphonic acid (made, for instance, by causing the components to react in alcohol or water in the presence of an excess of benzoquinone) are transformed into the dyestuff in the manner described in Example 2.

(4) 100 parts of the condensation product obtainable from 1 mol of tetrabromoquinone and 2 mols of 4-aminodiphenylamine-2-sulphonic acid (made, for instance, by causing the components to react in alcohol or water in the presence of an acid-binding agent) are transformed into the dyestuff in the manner described in Example 1. The dyeings obtained with this dyestuff are similar to those obtained with the dyestuff made as prescribed in Example 1.

(5) 100 parts of the condensation product obtainable from 1 mol of tetrachloroquinone and 2 mols of 4-aminodiphenylamine-4'-sulphonic acid (made, for instance, by causing the components to react in alcohol or water in the presence of an acid-binding agent) are dissolved in 2000 parts of fuming sulphuric acid containing 20 per cent of sulphuric anhydride and the solution is heated for about ½ to 1 hour at 70° C. The product is worked up as described in Example 1. The dyeings obtained with this dyestuff are of a somewhat more covered blue than those obtained with the dyestuff made as prescribed in Example 1.

(6) 100 parts of the condensation product obtainable from 1 mol of tetrachloroquinone and 2 mols of 4-aminophenyl-beta-naphthylamine-2-sulphonic acid (made, for instance, by causing the components to react in alcohol or water in the presence of an acid-binding agent) are stirred with 2000 parts of fuming sulphuric acid containing 20 per cent of sulphuric anhydride, and the mixture is heated for 1 to 2 hours at about 100° C. The product is worked up as described in Example 2. The dyestuff dyes blue-grey tints.

(7) 100 parts of the condensation product obtainable from 1 mol of chloranil and 2 mols of 4.4'-diamino-3'.5'-dichloro-diphenylamine-2-sulphonic acid are dissolved in 2000 parts of fuming sulphuric acid containing 20 per cent of sulphuric anhydride and the solution is heated for a short time at water-bath temperature. The product is worked up as described in Example 2. The dyestuff dyes greenish-blue tints.

(8) 50 parts of the condensation product obtainable from 1 mol of tetrachloroquinone and 2 mols of 4-amino-4'-nitro-diphenylamine-2'-sulphonic acid (made, for instance, by causing the components to react in alcohol or water in the presence of an acid binding agent) are stirred with 1000 parts of fuming sulphuric acid containing 20 per cent of sulphuric anhydride, and the mixture is heated for a short time at about 100° C. The product is worked up as described in Example 2. The dyestuff dyes blue-grey tints.

(9) 20 parts of the condensation product obtainable from 1 mol of tetrachloroquinone and 2 mols of 4-amino-4'-carboxydiphenylamine-2-sulphonic acid (made, for instance, by causing the components to react in alcohol or water in the presence of an acid-binding agent) are stirred with 400 parts of fuming sulphuric acid containing 20 per cent of sulphuric anhydride, and the mixture is heated for a short time at about 100° C. The product is worked up as described in Example 2. The dyestuff dyes cotton clear blue tints.

(10) 100 parts of the condensation product obtainable from 1 mol of tetrachloroquinone and 2 mols of 4-amino-4'-methyldiphenylamine-2-sulphonic acid (made, for instance, by causing the components to react in alcohol or water in the presence of an acid-binding agent) are stirred with 2000 parts of fuming sulphuric acid containing 20 per cent of sulphuric anhydride for about 2 hours at ordinary temperature. The product is worked up as described in Example 2. The dyeings obtained with this dyestuff are similar to those obtained with the dyestuff obtainable as prescribed in Example 1, but have a more reddish hue.

(11) 50 parts of the condensation product obtainable from 1 mol of tetrachloroquinone and 2 mols of 4-amino-4'-acetyl-amino-diphenylamine-2-sulphonic acid are introduced into 700 parts of fuming sulphuric acid containing 20 per cent of sulphuric anhydride at 15° C. to 20° C. A green-blue solution is thus obtained which is stirred for 10 hours at 15° C. to 20° C. The solution is then poured on ice. The dyestuff may be separated by salting out; it is washed with a solution of sodium chloride until neutral and dried. It forms a blue powder which dissolves in concentrated sulphuric acid to a greenish-blue solution, whereas the parent material dissolves to a yellow-brown solution. The dyestuff dyes cotton from a neutral bath clear blue-green tints which in artificial light have a still greener appearance.

(12) 50 parts of the condensation product obtainable from 1 mol of chloranil and 2 mols of 4-amino-4'-chloro-diphenyl-amine - 2 - sulphonic acid are dissolved in 1000 parts of fuming sulphuric acid containing 20 per cent of sulphuric anhydride at 20° C. to 25° C. and stirred for 10 hours at this temperature. The product is worked up as described in Example 1. The dyestuff dissolves in concentrated sulphuric acid to a blue solution, whereas the parent material dissolves in the acid to an olive-brown solution. The dyestuff dyes cotton pure blue tints, which are distinguished by a particularly good fastness to acid.

(13) 50 parts of the condensation product obtainable as described above from 1 mol of chloranil and 2 mols of 4-amino-3.4'-dichloro-diphenylamine-2-sulphonic acid are stirred with 700 parts of fuming sulphuric acid containing 20 per cent of sulphuric anhydride for 5 hours at 20° C. to 25° C. The mass is then poured on 1500 parts of ice and the blue mass is boiled for 5 hours. After salting out, the dyestuff is washed with a solution of sodium chloride until neutral and dried. It dissolves in concentrated sulphuric acid to a blue solution, whereas the parent material dissolves in the acid to a turbid yellow solution. The dyestuff dyes cotton and silk blue tints which have a more reddish hue than those obtained with the dyestuffs obtainable as described in Examples 1 and 12.

(14) 50 parts of the condensation product obtainable from 1 mol of tetrachloroquinone and 2 mols of 4-amino-3'-chlorodiphenylamine-2-sulphonic acid are stirred with 700 parts of fuming sulphuric acid containing 20 per cent of sulphuric anhydride for 1 hour at 20° C. to 25° C. and for a further hour at 50° C. to 55° C. The solution is poured on 1500 parts of ice. The blue mass is boiled for 3½ hours. The product is worked up as described in Example 13. The dyestuff dissolves in concentrated sulphuric acid to a blue solution, whereas the parent material dissolves in the acid to a yellow-brown solution. The dyestuff dyes cotton and silk beautiful intense red-blue tints.

We claim:

1. The process which comprises causing fuming sulphuric acid to act on a compound of the general formula:

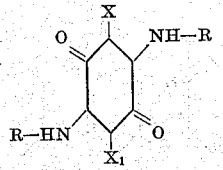

wherein X and $X_1$ represent a member of the group consisting of hydrogen, halogen and alkyl and R represents a member of the group consisting of sulphonated diphenylamine and sulphonated phenylnaphthylamine radicals, and heating for some hours the product thus obtained in the presence of dilute sulphuric acid.

2. The process which comprises causing fuming sulphuric acid containing 20% of $SO_3$ to act at room temperature for some hours on the compound of the formula:

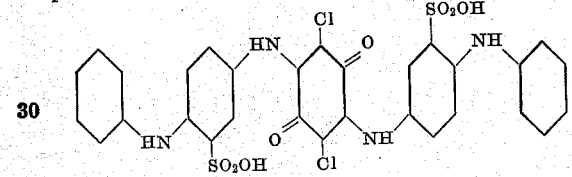

and heating for some hours the product thus obtained in presence of diluted sulphuric acid.

3. The process which comprises causing fuming sulphuric acid containing 20% of $SO_3$ to act at room temperature for some hours on the compound of the formula:

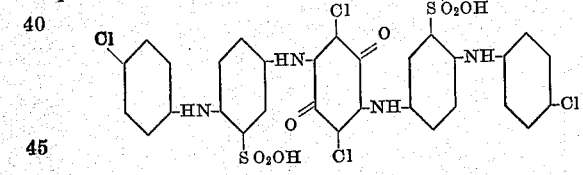

and heating for some hours the product thus obtained in presence of diluted sulphuric acid.

4. The process which comprises causing fuming sulphuric acid containing 20% of $SO_3$ to act at about 20° C. to about 55° C. for some hours on the compound of the formula:

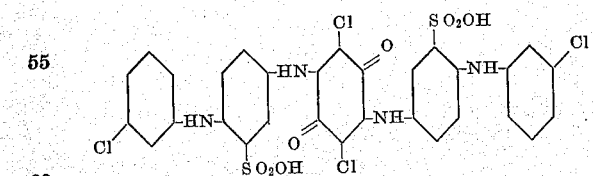

and heating for some hours the product thus obtained in presence of diluted sulphuric acid.

5. The process which comprises causing fuming sulphuric acid to act at a temperature between 0° C. and about 100° C. on a compound of the general formula:

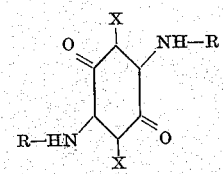

wherein X represent halogen and R represents a sulphonated diphenylamine radical, and heating for some hours the product thus obtained in the presence of dilute sulphuric acid.

6. The process which comprises causing fuming sulphuric acid to act at a temperature between 0° C. and about 100° C. on a compound of the general formula:

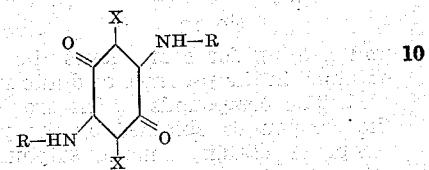

wherein X represents chlorine and R represents a sulphonated diphenylamine radical, and heating for some hours the product thus obtained in the presence of dilute sulphuric acid.

7. The compounds which are identical with the compounds obtained by the process which comprises causing fuming sulphuric acid to act on a compound of the general formula:

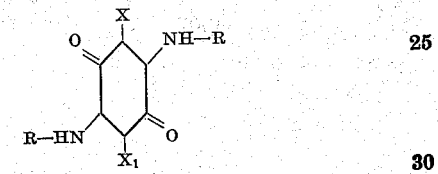

wherein X and $X_1$ represent a member of the group consisting of hydrogen, halogen and alkyl and R represents a member of the group consisting of sulphonated diphenylamine and sulphonated phenylnaphthylamine radicals, and heating for some hours the product thus obtained in the presence of dilute sulphuric acid.

8. The compounds which are identical with the compounds obtained by the process which comprises causing fuming sulphuric acid to act at a temperature between 0° C. and about 100° C. on a compound of the general formula:

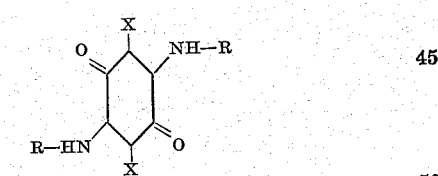

wherein X represents halogen and R represents a sulphonated diphenylamine radical, and heating for some hours the product thus obtained in the presence of dilute sulphuric acid.

9. The compounds which are identical with the compounds obtained by the process which comprises causing fuming sulphuric acid to act at a temperature between 0° C. and about 100° C. on a compound of the general formula:

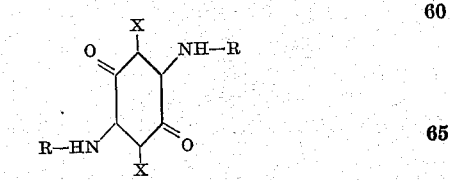

wherein X represents chlorine and R represents a sulphonated diphenylamine radical, and heating for some hours the product thus obtained in the presence of dilute sulphuric acid.

10. The compounds which are identical with the compounds obtained by the process which comprises causing fuming sulphuric acid containing 20% of $SO_3$ to act at room temperature for some hours on the compound of the formula:

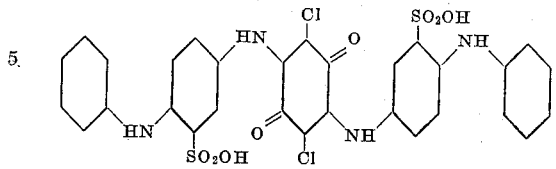

and heating for some hours the product thus obtained in the presence of dilute sulphuric acid.

11. The compounds which are identical with the compounds obtained by the process which comprises causing fuming sulphuric acid containing 20% of $SO_3$ to act at room temperature for some hours on the compound of the formula:

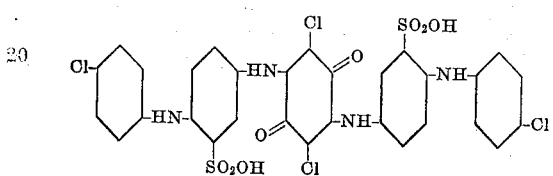

and heating for some hours the product thus obtained in the presence of dilute sulphuric acid.

12. The compounds which are identical with the compounds obtained by the process which comprises causing fuming sulphuric acid containing 20% of $SO_3$ to act at about 20° C. to about 55° C. for some hours on the compound of the formula:

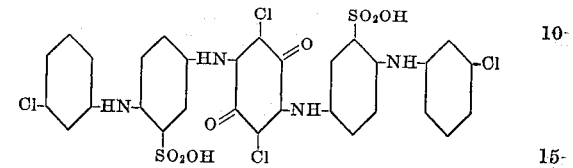

and heating for some hours the product thus obtained in the presence of dilute sulphuric acid.

ARNOLD BRUNNER.
HEINRICH GREUNE.
MAX THIELE.
KARL THIESS.